(12) United States Patent
Meador et al.

(10) Patent No.: US 11,787,323 B2
(45) Date of Patent: Oct. 17, 2023

(54) CONVEYOR SYSTEM FOR DELIVERY USING AUTONOMOUS VEHICLES

(71) Applicant: GM Cruise Holdings LLC, San Francisco, CA (US)

(72) Inventors: Timothy Jon Meador, Fairfield, CA (US); Alexis De Stasio, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 221 days.

(21) Appl. No.: 17/191,968

(22) Filed: Mar. 4, 2021

(65) Prior Publication Data

US 2022/0281371 A1     Sep. 8, 2022

(51) Int. Cl.
*B60P 1/38*       (2006.01)
*B60P 3/00*       (2006.01)
*B60W 60/00*      (2020.01)

(52) U.S. Cl.
CPC .............. *B60P 1/38* (2013.01); *B60P 3/007* (2013.01); *B60W 60/00256* (2020.02); *B60W 60/00259* (2020.02)

(58) Field of Classification Search
CPC ..... B60P 1/38; B60P 3/007; B60W 60/00256; B60W 60/00259
See application file for complete search history.

(56) References Cited

U.S. PATENT DOCUMENTS

| | | | |
|---|---|---|---|
| 2017/0045890 A1* | 2/2017 | Gurin | H04N 7/181 |
| 2018/0170675 A1* | 6/2018 | High | B65G 1/137 |
| 2019/0287063 A1* | 9/2019 | Skaaksrud | B65G 67/24 |
| 2020/0377000 A1* | 12/2020 | Saviranta | B62D 33/042 |
| 2021/0086900 A1* | 3/2021 | Christoffersson | B64D 9/00 |
| 2021/0198040 A1* | 7/2021 | Gil | G06Q 50/30 |
| 2021/0200210 A1* | 7/2021 | Gil | G06Q 10/08355 |
| 2021/0365046 A1* | 11/2021 | Sohn | B25J 9/16 |
| 2021/0380022 A1* | 12/2021 | Kanitz | B60N 2/01 |
| 2021/0387808 A1* | 12/2021 | Kalouche | B65G 1/1376 |
| 2022/0097588 A1* | 3/2022 | Ulsamer | B66C 1/36 |
| 2022/0129831 A1* | 4/2022 | Gil | B65G 1/133 |
| 2022/0129832 A1* | 4/2022 | Gil | B65G 1/0435 |
| 2022/0129833 A1* | 4/2022 | Gil | G06Q 10/083 |
| 2022/0169218 A1* | 6/2022 | Takasuga | B60T 8/1708 |

* cited by examiner

*Primary Examiner* — Saul Rodriguez
*Assistant Examiner* — Ashley K Romano
(74) *Attorney, Agent, or Firm* — Akona IP

(57) ABSTRACT

An autonomous vehicle (AV) includes a conveyor system arranged within its main cabin. The conveyor system includes attachment points for attaching transport bags to the conveyor system, and a motor to move the transport bags to different positions along the conveyor system. The AV includes a door that can open and close to provide access to the transport bags. The AV further includes a conveyor system controller that identifies a transport bag associated with a user and issues an instruction to the motor to move the transport bags along the conveyor system.

20 Claims, 7 Drawing Sheets

CONVEYOR SYSTEM FOR DELIVERY USING AUTONOMOUS VEHICLES

TECHNICAL FIELD OF THE DISCLOSURE

The present disclosure relates generally to autonomous delivery vehicles and, more specifically, to a conveyor system for storing and moving delivery loads within an autonomous vehicle.

BACKGROUND

In a conventional delivery context, a delivery driver drives a vehicle with items for delivery to recipients, and the driver removes the items for delivery and hand-delivers the items to their recipients. For example, a grocery delivery service may employ people to shop for a customer's groceries, load the groceries into a car, drive the groceries to a delivery address, and deliver the groceries from the car to the customer's doorstep.

Autonomous vehicles (AVs) can be used to deliver various items, such as groceries, to recipients. However, when an AV is used for delivery, there is nobody to assist the recipient with finding the recipient's items, or to prevent the recipient from accidentally or purposefully taking items being delivered to a different recipient. Existing AVs for grocery delivery have built-in compartments that can store different loads for different customers. However, such AVs are specifically designed for grocery delivery, and they cannot be repurposed for other applications, such as ride-sharing.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
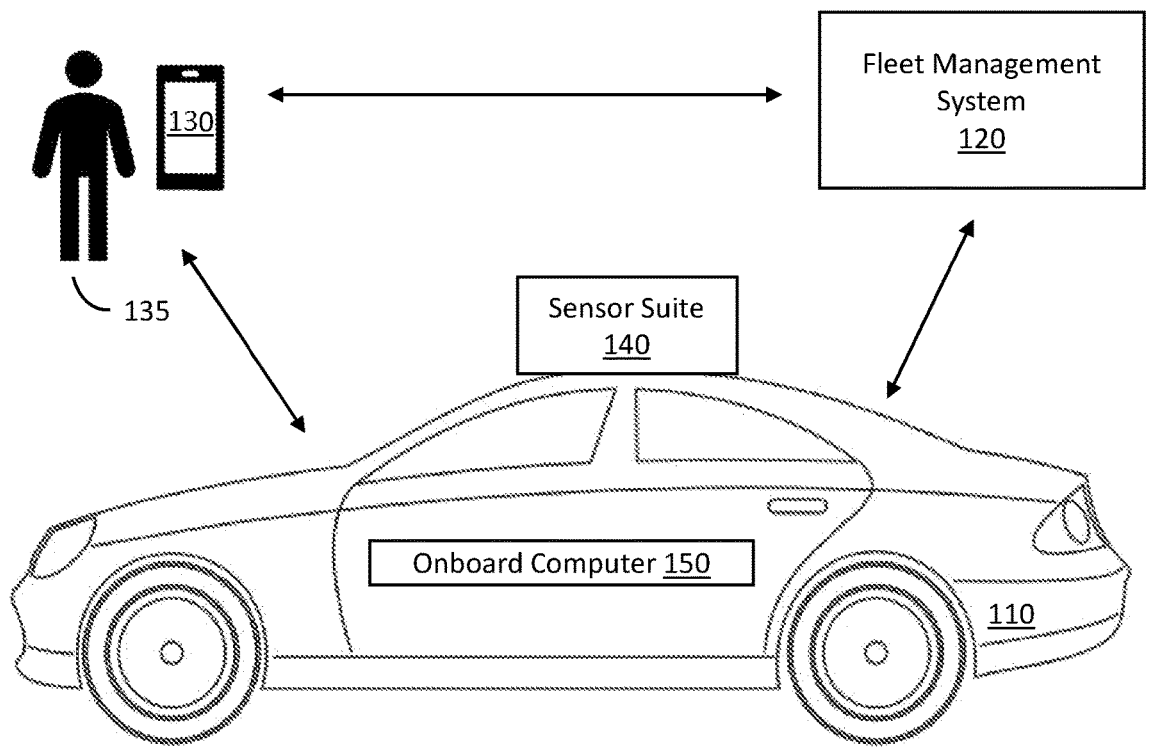
FIG. 1 is a block diagram illustrating an environment including an AV that can be used to deliver items to a user according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

Delivery vehicles often carry loads for multiple recipients simultaneously. For example, a vehicle used to delivery groceries receives multiple loads of groceries at a grocery store, and the vehicle drops off the loads of groceries to their respective recipients without returning to the grocery store between deliveries. When the vehicle is operated by a human driver, the driver typically ensures that each recipient receives the correct grocery load. However, when an AV is used to delivery groceries, there is no human operator to ensure that the grocery loads go to the correct recipients.

As described herein, an AV is equipped with a conveyor system that can hold multiple bags intended for different recipients, such as multiple bags of groceries. Each bag is attached to the conveyor system at a particular position, and the bags move around the conveyor system. When the AV reaches each recipient, the conveyor system moves the bags around the system so that the recipient can access the appropriate bag or bags. For example, an AV door opens up to provide access to a portion of the conveyor system. When the AV arrives at a particular recipient, the conveyor system positions a bag for delivery to that recipient at the AV door, so that the AV door opens up to the recipient's bag. The recipient can thus access the bag intended for that recipient, while the other bags are not accessible. If the recipient is receiving multiple bags, the conveyor system may move after the recipient collects each bag to provide access to the other the bags. This ensures that recipients can easily access the bag or bags intended for them, and that bags are not accidentally or maliciously accessed by unintended recipients.

The conveyor system can be mounted in an AV that can be alternately configured to provide passenger services and delivery services. For example, the AV may have a main cabin with passenger seating, e.g., two rows of seats that face each other. The conveyor system may be installed within the main cabin while leaving the seats in place. While the conveyor system is installed, the AV may be used solely for delivery services. The conveyor system can be removed so that the AV can resume passenger services. This allows the AV to be repurposed based on fluctuating consumer demand or other factors.

Embodiments of the present disclosure provide an AV that includes a conveyor system, a door, and a conveyor system controller. The conveyor system is arranged with a cabin of the AV and includes a plurality of attachment points for attaching a plurality of transport bags to the conveyor system and a motor to move the plurality of transport bags to different positions along the conveyor system. The door is to provide a user access to at least one of the transport bags. The conveyor system controller is configured to identify a transport bag associated with a user and to issue an instruction to the motor to move the plurality of transport bags along the conveyer system such that the identified transport bag is accessible to the user at the door.

Additional embodiments of the present disclosure provide a conveyor system that includes a rail to mount to a ceiling of a vehicle, a plurality of attachment points for attaching a plurality of transport bags to the rail, a motor to move the plurality of transport bags to different positions along the conveyor system, and a conveyor system controller configured to identify a transport bag associated with a user and issue an instruction to the motor to move the plurality of transport bags along the conveyer system such that the identified transport bag is accessible to at a door of the vehicle.

Further embodiments of the present disclosure provide a method for delivering a transport bag to a user that includes identifying a transport bag associated with a user, the transport bag attached to a conveyor system mounted in an AV; identifying a first position along the conveyor system of the identified transport bag; instructing a motor to move the conveyor system so that the identified transport bag moves from the first position along the conveyor system to a second position along the conveyor system, the second position proximate to a door of the AV; and instructing a door of the AV to open so that a user can access the identified transport bag from the AV.

As will be appreciated by one skilled in the art, aspects of the present disclosure, in particular aspects of conveyor systems for AVs, described herein, may be embodied in various manners (e.g., as a method, a system, an AV, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example Environment for AV Delivery

FIG. 1 is a block diagram illustrating an environment including an AV that can be used to deliver items to a user according to some embodiments of the present disclosure. The environment includes an AV 110, a fleet management system 120, and a user device 130. The AV 110 includes a sensor suite 140 and an onboard computer 150. The fleet management system 120 may manage a fleet of AVs that are similar to AV 110; the other AVs in the fleet may also include a sensor suite and onboard computer. The fleet management system 120 receives service requests for the AVs 110 from user devices 130. For example, a user 135 makes a request for delivery of groceries using an app executing on the user device 130. The user device 130 may transmit the request directly to the fleet management system 120, or the user device 130 may transmit the request to a separate service (e.g., a service provided by a grocery store) that coordinates with the fleet management system 120 to deliver orders to users. The fleet management system 120 dispatches the AVs 110 to carry out the service requests. For example, the fleet management system 120 instructs the AV 110 to pick up multiple loads of groceries from a grocery store and to deliver the groceries to different users, e.g., one bag of groceries to user 135 at a first location, and another bag of groceries to another user at a second location. An operator loads each bag of groceries for delivery onto a conveyor system within the AV 110. The onboard computer 150 keeps track of the bags' positions on the conveyor system the AV 110. When the AV 110 arrives at a particular delivery location (e.g., the first location of the user 135), the conveyor system provides the bags for delivery at that location (e.g., the bag of groceries for the user 135).

The AV 110 is preferably a fully autonomous automobile, but may additionally or alternatively be any semi-autonomous or fully autonomous vehicle; e.g., a boat, an unmanned aerial vehicle, a self-driving car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The AV 110 includes a sensor suite 140, which includes a computer vision ("CV") system, localization sensors, and driving sensors. For example, the sensor suite 140 may include photodetectors, cameras, radar, sonar, lidar, GPS, wheel speed sensors, inertial measurement units (IMUS), accelerometers, microphones, strain gauges, pressure monitors, barometers, thermometers, altimeters, etc. The sensors may be located in various positions in and around the AV 110. For example, the sensor suite 140 includes multiple cameras mounted at different positions on the AV 110, including with in the main cabin for passengers and/or deliveries.

An onboard computer 150 is connected to the sensor suite 140 and functions to control the AV 110 and to process sensed data from the sensor suite 140 and/or other sensors in order to determine the state of the AV 110. Based upon the vehicle state and programmed instructions, the onboard computer 150 modifies or controls behavior of the AV 110. In addition, the onboard computer 150 controls the conveyor system and other AV components used in grocery delivery, such as the AV doors.

The onboard computer 150 is preferably a general-purpose computer adapted for I/O communication with vehicle control systems and sensor suite 140, but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems. Aspects of the onboard computer 150 are described further in relation to FIG. 7.

The fleet management system 120 manages the fleet of AVs, including AV 110. The fleet management system 120 may manage one or more services that provide or use the AVs, e.g., a service for providing rides to users with the AVs, or a service that delivers items, such as prepared foods, groceries, or packages, using the AVs. The fleet management system 120 may select an AV from the fleet of AVs to perform a particular service or other task, and instruct the selected AV to autonomously drive to a particular location (e.g., a delivery address). The fleet management system 120 may select a route for the AV 110 to follow. The fleet management system 120 also manages fleet maintenance tasks, such as charging, servicing, and cleaning of the AV. As shown in FIG. 1, the AV 110 communicates with the fleet management system 120. The AV 110 and fleet management system 120 may connect over a public network, such as the Internet. The fleet management system 120 is described further in relation to FIG. 8.

Example AV for Conveyor System Installation

Figure 2:
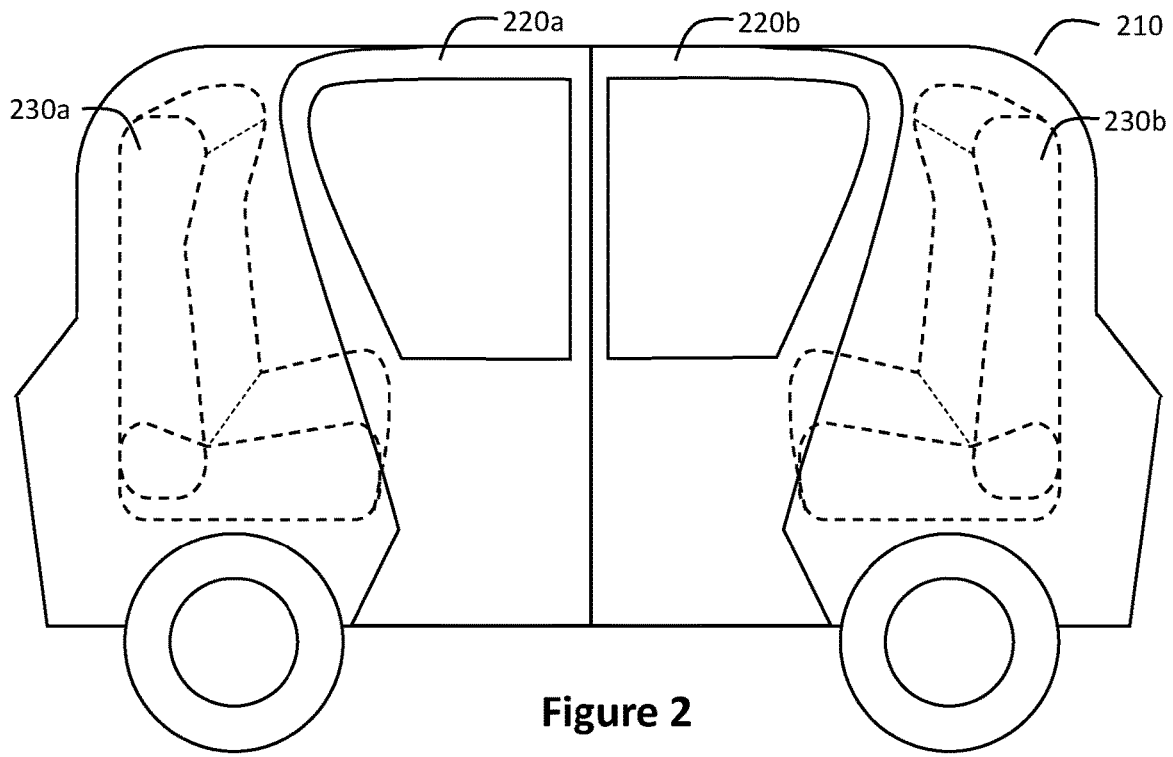
FIG. 2 illustrates an example AV with a main cabin that can be configured for grocery delivery according to some embodiments of the present disclosure.

FIG. 2 illustrates an example AV with a main cabin that can be configured for delivery according to some embodiments of the present disclosure. FIG. 2 shows an AV 210, which is an example of the AV 110 described with respect to FIG. 1. The AV 210 includes two outer doors 220a and 220b along one side of the AV 210. In some embodiments, the AV 210 includes two similar doors on the opposite side of the doors 220a and 220b. The doors 220 provide access to a main cabin of the AV 210. The main cabin may be used for passenger seating. In this example, the main cabin includes two rows of seats 230a and 230b. The two rows of seats 230a and 230b are arranged facing each other with a large gap between them.

Figure 3:
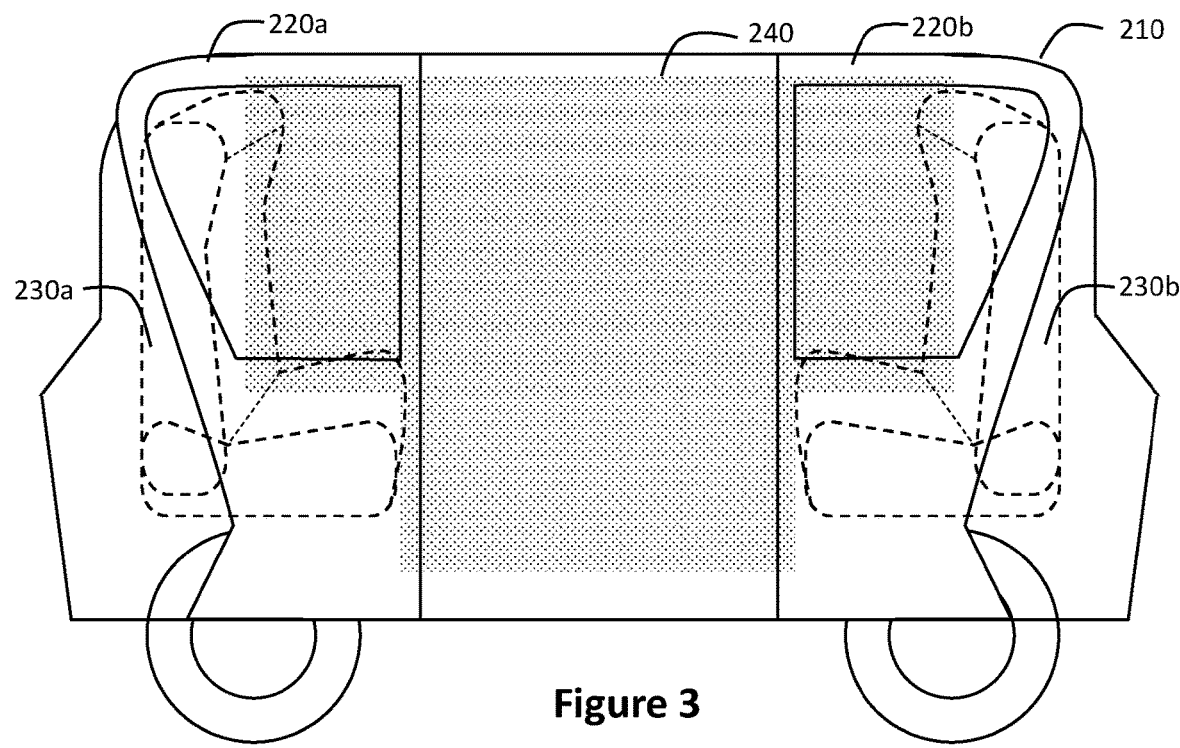
FIG. 3 illustrates the example AV with two of its doors open to the main cabin according to some embodiments of the present disclosure.
Figure 4:
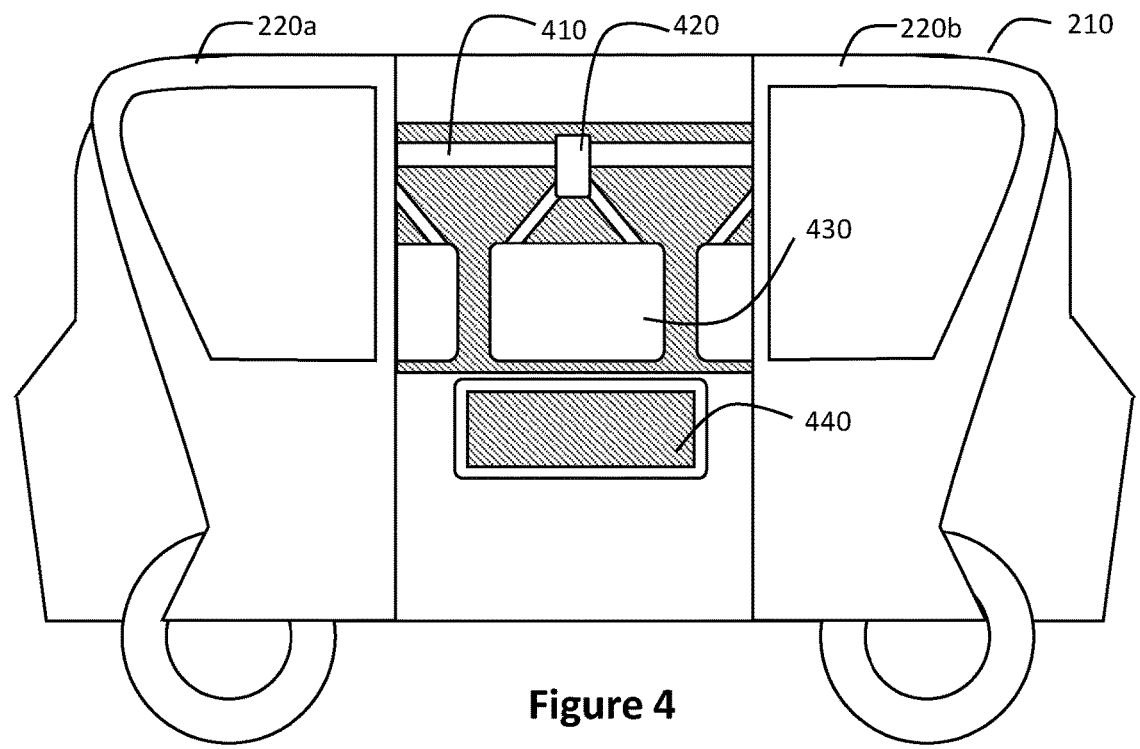
FIG. 4 illustrates the example AV with a conveyor system inside its main cabin according to some embodiments of the present disclosure.
Figure 5:
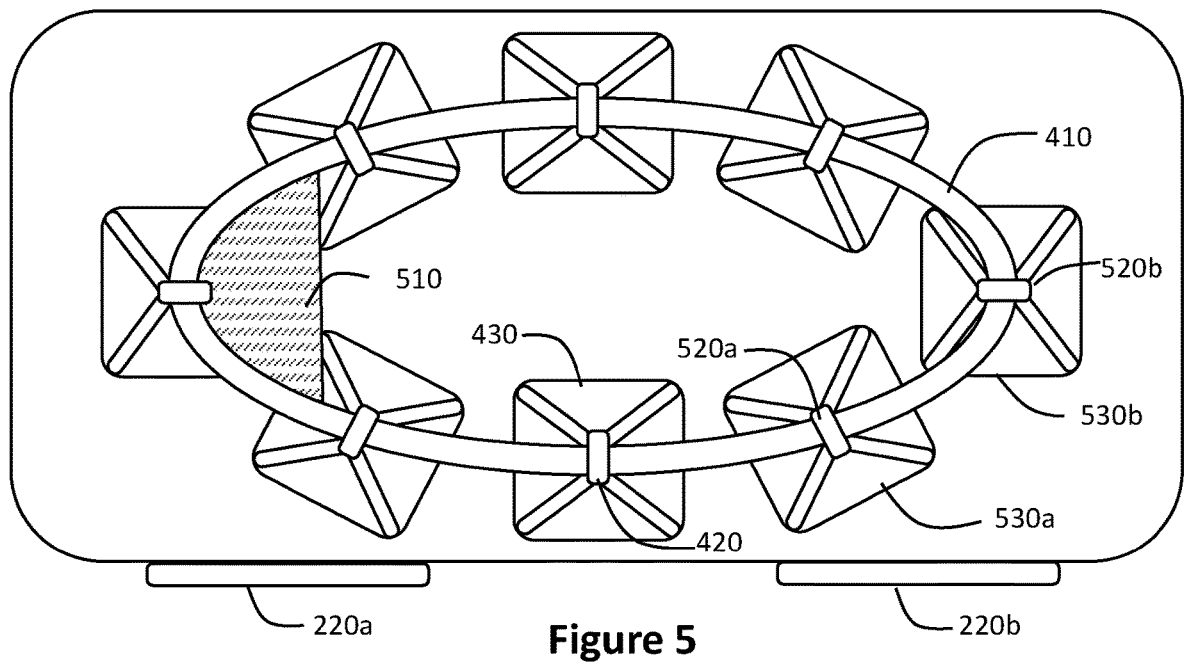
FIG. 5 illustrates a top view of the conveyor system according to some embodiments of the present disclosure.

To provide access to a main cabin of the AV 210, the left door 220a slides towards the left and the right door 220b slides to the right. In other embodiments, the doors 220 may open by hinges or other opening mechanisms. FIG. 3 illustrates the AV 210 with its doors 220a and 220b open to allow access to the main cabin. The shaded portion 240 between the seats 230a and 230b indicates the portion of the main cabin that is available to transport delivery items. In this example, the main cabin of the AV 210 includes the passenger seats 230 and the area 240 between the seats. A conveyor system can fit into the main cabin, and in particular, in the portion 240 between the seats 230. An example conveyor system mounted within the portion 240 of the main cabin is shown in FIGS. 4 and 5. In alternate embodiments, the AV 210 may have a different configuration, e.g., with seats in different positions, doors in different positions, doors opening in different ways, etc.

Keeping the seats 230a and 230b in the AV 210 when the AV 210 is configured for delivery enables the fleet manager to switch the AV 210 between a passenger mode and a delivery mode more easily. Removing the seats 230a and 230b from the AV 210 may be cumbersome, or may not be possible through the opening created by opening the doors 220a and 220b. Furthermore, repeated removal and reinstallation of the seats 230a and 230b may lead to increased wear and reduce their lifespan. In some cases, a fleet manager may cover the seats 230a and 230b with a protective cover while the AV 210 is used for delivery.

Example AV with Conveyor System

FIG. 4 illustrates the example AV 210 with a conveyor system inside its main cabin according to some embodiments of the present disclosure. The conveyor system includes a rail 410 mounted inside the AV 210, e.g., suspended from the ceiling of the AV 210 at one or more mounting points. Transport bags, such as transport bag 430, are attached to the rail 410 at attachment points, such as attachment point 420. Additional transport bags are attached to the rail 410 at other attachment points along the rail 410. The transport bag 430 is currently positioned at the opening between the doors 220a and 220b, so that a recipient of the transport bag 430 can remove the transport bag 430 from the AV 210.

The AV 210 includes a display 440 positioned below the transport bag 430. The display 440 is mounted to the AV 210 in the delivery configuration. The display 440 may be removed when the AV 210 is configured for passenger transport, or the display may be moved to another location within the AV 210, e.g., above one of the rows of seats 230. The display 440 may provide instructions or information to a user, such as instructions for removing the transport bag 430 from the attachment point 420. In some embodiments, the display 440 is interactive and can receive user input. For example, the display 440 may enable a user to provide identifying or verifying information, such as a name, a passcode, or an order number. In some embodiments, the display 440 or another component may implement additional or alternate technologies for user verification, such as a credit card reader or a biometric scanner. In response to verifying the user, the conveyor system may move the user's transport bag 430 to the opening between the doors 220a and 220b so that the user can retrieve the transport bag 430 from the AV 210.

FIG. 5 illustrates a top view of the conveyor system shown in FIG. 4. As was shown in FIG. 4, the two doors 220a and 220b are open to the transport bag 430, which is hanging from the rail 410 at the attachment point 420. Seven additional transport bags, including transport bags 530a and 530b, are shown hanging from the rail 410 at additional attachment points, including attachment points 520a and 520b. In other embodiments, the rail 410 may include more or fewer attachment points for holding more or fewer transport bags. While the additional transport bags 520 shown in FIG. 5 are similar to the transport bag 430, in other embodiments, different types of transport bags, or a combination of types of transport bags may be used.

Figure 11:
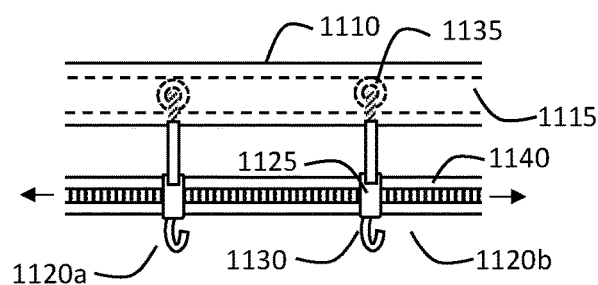
FIG. 11 illustrates a detailed view of a rail and two attachment points according to some embodiments of the present disclosure.
Figure 12:
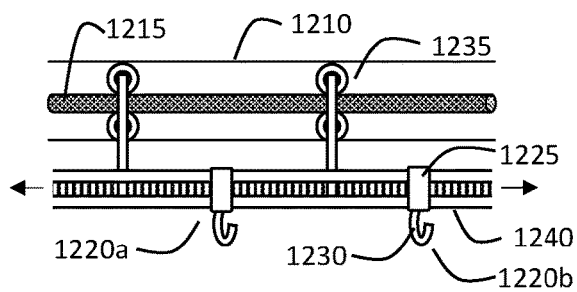
FIG. 12 illustrates a detailed view of an alternative implementation of the rail and attachment points according to some embodiments of the present disclosure.

The conveyor system includes a motor 510 for automatically moving the transport bags along the rail 410. More specifically, the motor 510 revolves the attachment points 420 and 520 along the rail 410; this in turn revolves the transport bags 430 and 530 along the rail 410. For example, the motor 510 may revolve the attachment points in a clockwise direction, so that the transport bag 530a is positioned between the doors 220a and 22b, the transport bag 530b takes the place of transport bag 530a, etc. The motor 510 is controlled by the onboard computer 150. In some embodiments, the motor 510 can move the attachment points in either a clockwise or a counterclockwise direction. Two examples of how the attachment points 420 and 520 may be connected to the rail 410 are shown in FIGS. 11 and 12, described below.

Example Transport Bag

Figure 6:
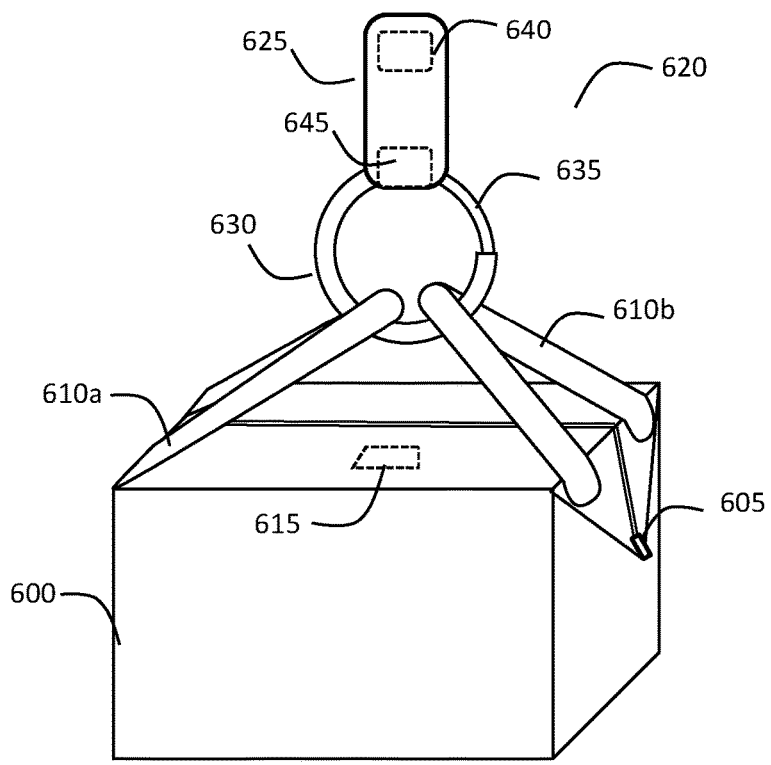
FIG. 6 illustrates a detailed view of a transport bag attached to the conveyor system at an attachment point according to some embodiments of the present disclosure.

FIG. 6 illustrates a detailed view of a transport bag 600 attached to the conveyor system at an attachment point 620 according to some embodiments of the present disclosure. The transport bag 600 is an example of the transport bags 430 and 530 shown in FIGS. 4 and 5. The attachment point 620 is an example of the attachment points 420 and 520 shown in FIGS. 4 and 5. The transport bag 600 may be a bag for holding groceries. In other embodiments, the transport bag 600 may be used for items besides groceries, such as prepared foods or consumer goods. The transport bag 600 may have insulated sides. The transport bag 600 may have a rigid bottom to support items within the bag while suspended from the conveyor system. The transport bag 600 may have rigid or semi-rigid sides to protect the items within the bag. Furthermore, transport bags with rigid or semi-rigid sides may predictably fit within an AV in a certain arrangement, e.g., a particular number of bags with a particular spacing may fit on the conveyor system shown in FIGS. 4 and 5.

In this example, the transport bag 600 has a zipper closure 605 and two straps 610a and 610b. The straps 610 are suspended from the attachment point 620. In this example, the attachment point 620 includes a control portion 625 and a hook 630. The control portion 625 includes circuitry for monitoring the transport bag 600, e.g., whether a transport bag 600 is attached to the attachment point 620, which transport bag 600 is attached to the attachment point, and the weight of the transport bag 600. In this example, the control portion 625 includes a weight sensor 640 and a radio frequency identification (RFID) reader 645. The control portion 625 also physically couples the hook 630 to the rail (not shown in FIG. 6). Two example arrangements for coupling the control portion 625 to a rail are shown in FIGS. 11 and 12.

The weight sensor 640 measures a weight suspended from the attachment point 620, i.e., the weight of the transport bag 600. The weight sensor 640 is connected to the onboard computer 150, which can use the weights to determine whether or not a transport bag is connected to a given attachment point. The onboard computer 150 may also use the weight measurements to ensure that the total load supported by the conveyor system does not exceed weight limits, and that the load around the conveyor system is properly balanced.

The RFID reader 645 reads a corresponding RFID tag 615 in the transport bag 600. The RFID tag 615 may be a passive RFID tag or an active RFID tag. The RFID reader 645 is positioned to receive digital data from the RFID tag 615. The RFID reader 645 may have a range that includes the location of the RFID tag 615 on the transport bag 600, but does not include the location of RFID tags on neighboring transport bags. In other configurations, the RFID tag 615 and RFID reader 645 may be closer together, e.g., the RFID reader 645 may be on the hook 630, or the RFID tag 615 may be embedded in one of the straps 610. The RFID tag 615 may include an identifier that is associated with a particular order or a particular user. For example, when groceries for a grocery order are loaded into the transport bag 600 at the grocery store, another RFID reader in the store reads the identifier of the transport bag 600 and associates the identifier with the recipient of the particular grocery order. The RFID reader 645 obtains the identifier from the RFID tag 615 and passes the identifier to the onboard computer 150. The onboard computer 150 may associate the transport bag 600 and/or the attachment point 620 with the recipient. The onboard computer 150 can then control the position of the attachment points along the conveyor system to provide the transport bag 600 to its recipient. In other embodiments, alternate technologies, such as barcodes, are used to identify transport bags, as described with respect to FIG. 7.

The hook 630 physically connects the transport bag 600 to the attachment point 620 and, more generally, to the conveyor system; in this case, the hook 630 holds the straps 610. The hook 630 includes a locking portion 635 that, when closed, forms a full loop around the straps 610, as shown in FIG. 6. The locking portion 635 may be controlled by the control portion 625. The locking portion 635 may hinge open or retract into the hook 630 to open the hook 630 and provide access to the transport bag 600. The locking portion 635 may secure the transport bag 600 during travel, so that the straps 610 do not slip off the hook 630 while the AV is moving. Furthermore, the locking portion 635 may open or retract when an authorized recipient of the transport bag 600 is accessing the main cabin. This prevents non-authorized users (e.g., recipients of other transport bags) from reaching into the cabin and taking transport bags not intended for them.

It should be understood that the transport bag 600 and attachment point 620 shown in FIG. 6 represent one possible configuration. In other examples, transport bags may have different shapes, more or fewer straps, different types of closures, etc. In other examples, the conveyor system may hold other objects besides bags, such as crates or boxes. In other examples, the control and/or locking mechanisms of the attachment point 620 may be different, or the attachment point 620 may be a simple hook without control components or locking components.

Example Onboard Computer

Figure 7:
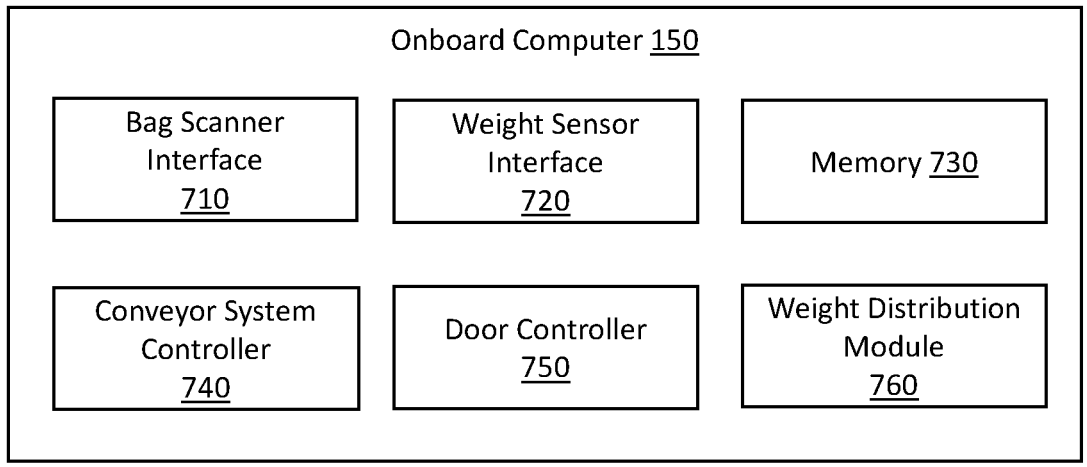
FIG. 7 is a block diagram illustrating an onboard computer for enabling delivery according to some embodiments of the present disclosure.

FIG. 7 is a block diagram illustrating an onboard computer 150 for enabling delivery according to some embodiments of the present disclosure. The onboard computer 150 includes a bag scanner interface 710, a weight sensor interface 720, a memory 730, a conveyor system controller 740, a door controller 750, and a weight distribution module 760. In alternative configurations, fewer, different and/or additional components may be included in the onboard computer 150. For example, components and modules for controlling movements of the AV 110 and other vehicle functions, and components and modules for communicating with other systems, such as the fleet management system 120, are not shown in FIG. 7. Further, functionality attributed to one component of the onboard computer 150 may be accomplished by a different component included in the onboard computer 150 or a different system from those illustrated.

The bag scanner interface 710 interfaces with one or more scanners for collecting data identifying transport bags. For example, the bag scanner interface 710 interfaces with RFID readers incorporated at each attachment point, such as the RFID reader 645 shown in FIG. 6. In another example, the conveyor system includes a single RFID reader mounted near the doors 220 that reads the RFID tags of transport bags as they are being loaded into the AV 210. In this example, the conveyor system controller 740 detects the position of the conveyor system, e.g., which attachment point is located proximate to the opening between the doors 220, and associates this attachment point with the detected transport bag as the transport bag is being loaded into the AV 210. In another example, the bag scanner interface 710 interfaces with a RFID reader separate from the AV 210, e.g., a handheld RFID reader that an operator loading bags into the AV 210 uses to scan each bag as it is being loaded into the AV 210. In some embodiments where a handheld scanner is used, each attachment point may include a RFID tag rather than the RFID reader 645; an operator loading the bags may scan the RFID tags of the bag and the attachment point where the operator loads the bags in succession to indicate that the scanned bag is being loaded onto the scanned attachment point.

In other embodiments, different types of scanning or near-field communications technologies may be used instead of RFID. For example, each transport bag may have a barcode or QR (Quick Response) code, and the bag scanner interface 710 receives an identifier from a bar code reader or QR scanner. The bag scanner interface 710 may provide data received from the bag scanner to the conveyor system controller 740, and the conveyor system controller 740 stores data associating attachment points with bag identifiers in the memory 730.

The weight sensor interface 720 receives weight measurements from weight sensors included in the attachment points, such as the weight sensor 640 shown in FIG. 6. The weight sensor interface 720 may request a weight measurement when the bag scanner interface 710 detects that a transport bag has been loaded or unloaded from the AV 210, or at periodic intervals. The weight sensor interface 720 passes the weight data to the weight distribution module 760 and/or stores the weight measurements in the memory 730.

The memory 730 stores data associating the transport bags on the conveyor system with particular users or orders. In one example, the memory 730 stores the RFID tag identifier of the transport bag at each of the attachment points. The memory 730 may also receive and store data associating the transport bags (e.g., the RFID identifiers) with users (e.g., a user identifier or order number). For example, the fleet management system 120 may provide data associating transport bags with their recipients to the conveyor system controller 740, and the conveyor system controller 740 stores this data in the memory 730. The memory 730 may store other data related to the conveyor system, such as weight measurements from the weight sensor interface 720, or a current position of the conveyor system (e.g., which attachment point is located near the doors 220).

The conveyor system controller 740 controls operation of the conveyor system. As noted above, the conveyor system controller 740 receives and stores data from the bag scanner interface 710, fleet management system 120, or other sources that associates transport bags with particular users and particular attachment points in the conveyor system. In addition, the conveyor system controller 740 controls the position of the transport bags on the conveyor system. In particular, the conveyor system controller 740 sends instructions to the motor 510 to revolve the attachment points, and thus their attached transport bags, about the conveyor system. The conveyor system controller 740 may also instruct the motor 510 to hold the attachment points in a particular position, e.g., while the AV 210 is in transit, or while a user is accessing a transport bag.

As an example, when the AV 210 reaches the drop-off location of a particular user who is receiving a particular transport bag, the conveyor system controller 740 access data in the memory 730 to identify the current position of the conveyor system (e.g., which attachment point is located at a door 220) and data to identify the current position of the transport bag associated with the user (e.g., which attachment point is holding the user's transport bag). The conveyor system controller 740 generates an instruction to the motor to move the conveyor system based on the current position of the conveyor system and the current position of the transport bag. For example, in the configuration shown in FIG. 5, if the transport bag 530a is being delivered to the user, the conveyor system controller 740 instructs the motor 510 to revolve the conveyor system in a clockwise motion so that the transport bag 530a is in the position of the transport bag 430 shown in FIG. 5.

If a user is receiving multiple transport bags, the conveyor system controller 740 instructs the motor to revolve the conveyor system so that each of the transport bags being delivered to the user can be retrieved. For example, the weight sensor interface 720 receives weight measurements for the attachment point of a first transport bag being collected by a user. When the weight sensor interface 720 detects that the first transport bag has been removed (i.e., its weight is no longer detected at the attachment point), the conveyor system controller 740 instructs the motor 510 to move the position of the conveyor system so that a second transport bag is accessible to the user, e.g., so that the second transport bag is positioned at the opening between the doors 220. In some embodiments, the conveyor system controller 740 may wait a threshold amount of time (e.g., 5 or 10 seconds) to move the conveyor system to not disturb a user in the process of lifting and removing a transport bag. In some embodiments, the conveyor system controller 740 accesses other sensors in the sensor suite 140 (e.g., cameras mounted inside or outside the vehicle) to determine when a user has successfully removed a transport bag from the AV 210. In some embodiments, the user may indicate when the conveyor system should proceed to the next transport bag, e.g., by selecting a "next bag" button on a touchscreen display.

In some embodiments, the conveyor system controller 740 authorizes a user prior to providing access to the transport bag. For example, the user may use a touchscreen device, such as display 440, to enter identifying or verifying information, as described with respect to FIG. 4. In another example, the AV 210 includes a camera and uses facial recognition to verify the user. In response to verifying the user, the conveyor system controller 740 may move the user's transport bag to the opening between the doors 220. If the attachment point includes a locking mechanism, such as the locking portion 635 shown in FIG. 6, the conveyor system controller 740 may instruct the attachment point to unlock the transport bag in response to verifying the user.

Figure 9:
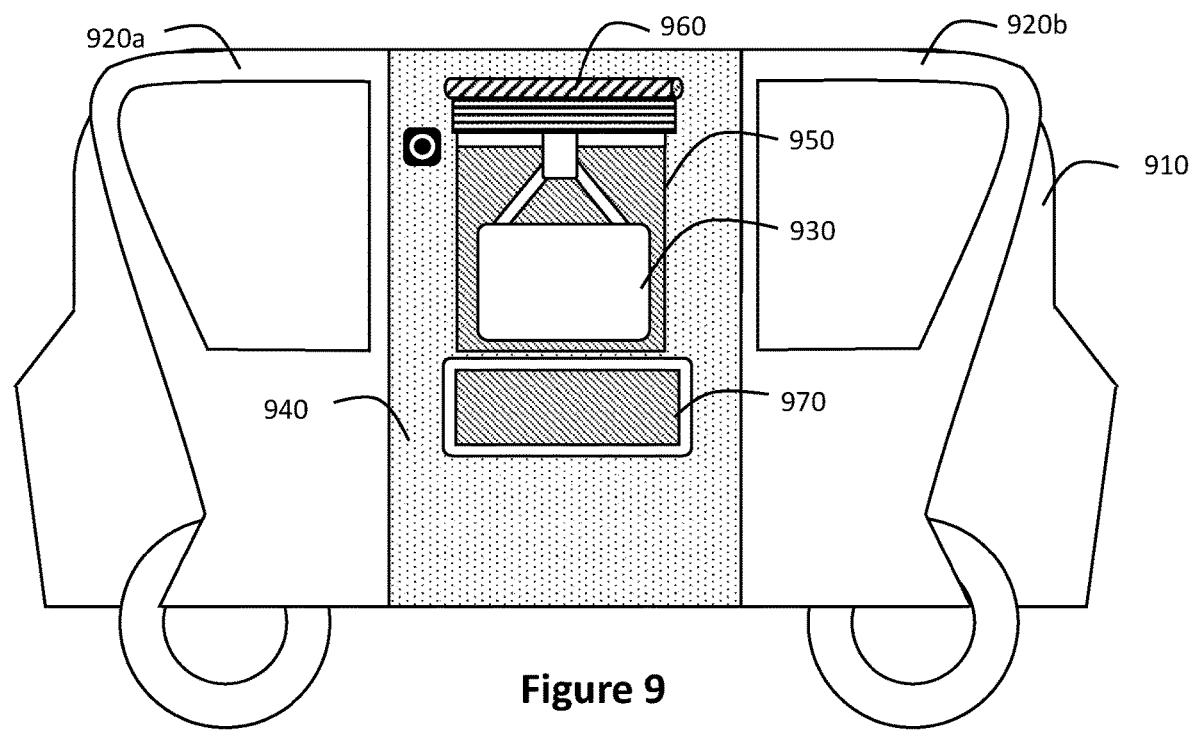
FIG. 9 illustrates the example AV with a delivery window behind the main AV doors according to some embodiments of the present disclosure.
Figure 10:
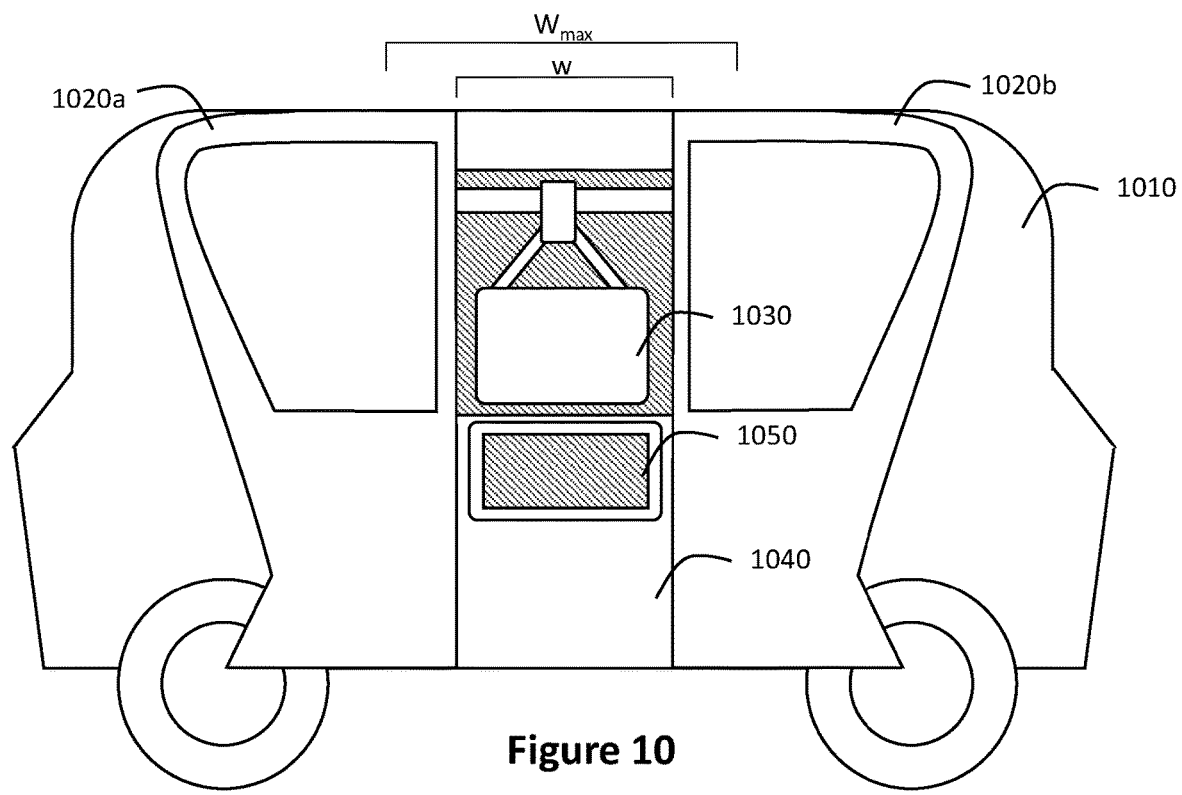
FIG. 10 illustrates the example AV with partially opened doors according to some embodiments of the present disclosure.

The door controller 750 controls automatic opening and closing of the doors 220. For example, when the AV 210 reaches the location of a user, the door controller 750 automatically opens the doors 220 to provide access to the transport bag. In some embodiments, the door controller 750 opens the doors 220 after the motor 510 has moved the transport bag intended for the user to the position between the doors 220. In some embodiments, the door controller 750 opens a single door, and the conveyor system controller 740 positions the transport bag intended for the user behind the single door. In some embodiments, the door controller 750 can control the amount that the door or doors 220 open. For example, the door controller 750 opens the doors 220 so that they provide an opening that is slightly wider than the transport bag, but not the full width that the doors 220 can open. This may prevent users from reaching into the AV 210, e.g., to tamper with other transport bags. An example is shown in FIG. 10. In some embodiments, the AV 210 includes a window behind the doors 220 that provides access to the transport bags but prevents users from accessing the main cabin. An example is shown in FIG. 9. The door controller 750, or a second controller, may control opening and closing of this window.

The weight distribution module 760 monitors the weights of the transport bags and the distribution of weight around the conveyor system. The weight distribution module 760 may check for rules regarding the weight of individual transport bags, e.g., no bag may weight more than 50 pounds. In some embodiments, users may be able to specify a weight limit for their deliveries, e.g., a bag for a particular recipient may weigh no more than 25 pounds. If the weight distribution module 760 detects that a particular transport bag exceeds a weight limit for the conveyor system or a weight limit for a particular user, the weight distribution module 760 may output an alert (e.g., via the display 440) for the operator loading the transport bags to reconfigure a delivery, e.g., to separate items in the overweight bag into two bags. The weight distribution module 760 may also check for rules regarding the overall weight limit of the conveyor system, e.g., a rule that the conveyor system can hold no more than 500 pounds, and output an alert if the weight limit is exceeded.

The weight distribution module 760 may also ensure that weight is properly distributed around the conveyor system. For example, if the conveyor system has too much weight on one side, this may affect the AV's handling, or may cause instability in the conveyor system when the AV 210 is driving. As the conveyor system is being loaded, the weight distribution module 760 may detect the weight and position of each transport bag, and if the weights are not evenly distributed (e.g., three heavy bags are loaded on one side, and three light bags are loaded on another side), the weight distribution module 760 may output instructions to an operator to move bags to different locations. The weight distribution module 760 may cooperate with the conveyor system controller 740 and the operator to redistribute the transport bags, e.g., instructing an operator to remove a transport bag from a first attachment point, instructing the conveyor system controller 740 to move a second attachment point to the door opening, and instructing the operator to hang the transport bag on the second attachment point.

The weight distribution module 760 and/or conveyor system controller 740 may access delivery route information and determine an arrangement for the transport bags on the conveyor system based on the delivery route. For example, if the AV 210 is making two deliveries, each with four transport bags, the weight distribution module 760 may have an operator load the bags in an alternating fashion, i.e., each bag in the first order is adjacent to two bags for the second order, and vice versa. This way, when the first delivery is unloaded from the conveyor system, the remaining bags are distributed throughout the conveyor system, rather all being positioned along one side of the conveyor system. In some embodiments, the weight distribution module 760 determines an optimal position of the conveyor system during transit. For example, if the bags are not evenly distributed across the conveyor system, placing the heavier bags near the rear of the AV 210 may increase stability of the vehicle and/or the conveyor system. The weight distribution module 760 may instruct the conveyor system controller 740 to instruct the motor 510 to move the conveyor system into the determined position during transit.

Example Fleet Management System

Figure 8:
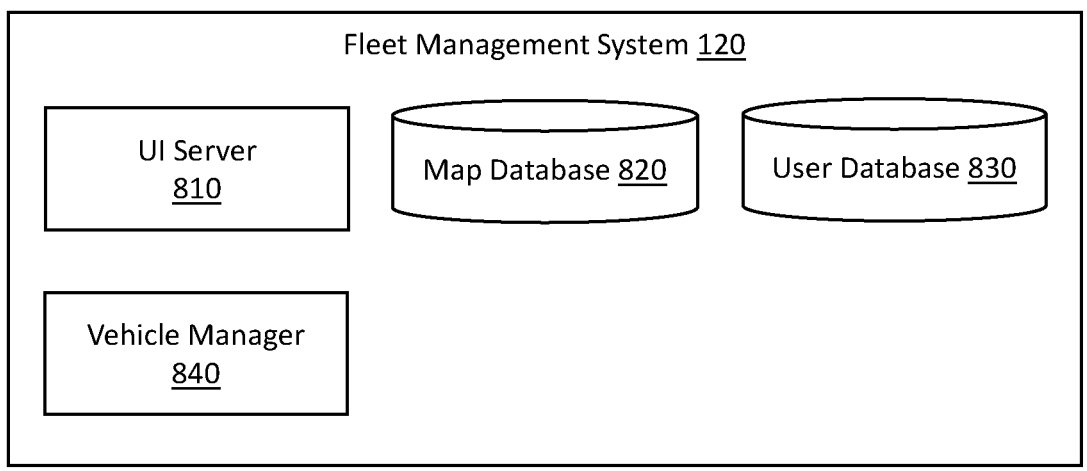
FIG. 8 is a block diagram of a fleet management system according to some embodiments of the present disclosure.

FIG. 8 is a block diagram illustrating the fleet management system 120 according to some embodiments of the present disclosure. The fleet management system 120 includes a UI (user interface) server 810, a map database 820, a user database 830, and a vehicle manager 840. In alternative configurations, different, additional, or fewer components may be included in the fleet management system 120. Further, functionality attributed to one component of the fleet management system 120 may be accomplished by a different component included in the fleet management system 120 or a different system than those illustrated.

The UI server 810 is configured to communicate with client devices that provide a user interface to users. For example, the UI server 810 may be a web server that provides a browser-based application to client devices, or the UI server 810 may be a mobile app server that interfaces with a mobile app installed on client devices, such as the user device 130. The user interface enables the user to access a service of the fleet management system 120, e.g., to request a ride from an AV 110, or to request a delivery from an AV 110. For example, the UI server 810 receives a request a delivery that includes a pickup location (e.g., a local restaurant) and a destination location (e.g., the user's home address). In some embodiments, the UI server 810 or another server receives requests from another service, e.g., a grocery delivery service. For example, the fleet management system 120 receives a request from a grocery delivery service to deliver groceries from a grocery store to a recipient on behalf of the grocery delivery service.

The map database 820 stores a detailed map describing roads and other areas (e.g., parking lots, AV service facilities) traversed by the fleet of AVs 110. The map database 820 includes data describing roadways (e.g., locations of roadways, connections between roadways, roadway names, speed limits, traffic flow regulations, toll information, etc.), data describing buildings (e.g., locations of buildings, building geometry, building types), and data describing other objects (e.g., location, geometry, object type), and data describing other features, such as bike lanes, sidewalks, crosswalks, traffic lights, parking lots, etc.

The user database 830 stores data describing users of the fleet of AVs 110. Users may create accounts with the fleet management system 120, which stores user information associated with the user accounts in the user database 830. The user information may include identifying information (name, user name), password, payment information, home address, contact information (e.g., email and telephone number), and information for verifying the user (e.g., photograph, driver's license number). Users may provide some or all of the user information to the fleet management system 120. In some embodiments, the user database 830 stores data received from one or more other services, e.g., a grocery delivery service that requests AVs 110 to make deliveries on behalf of the grocery delivery service. The user database 830 may store data describing transport bags associated with users, e.g., identifiers of RFID tags attached to bags holding items intended for a particular user.

The vehicle manager 840 directs the movements of the AVs 110 in the fleet. The vehicle manager 840 receives service requests from users from the UI server 810 or from other services that rely on the AVs 110, and the vehicle manager 840 assigns service requests to individual AVs 110. For example, in response to a request for grocery delivery from an origin location to a destination location, the vehicle manager 840 selects an AV and instructs the AV to drive to the origin location (e.g., the grocery store) and then instructs the AV to drive to the destination location (e.g., the delivery destination location) and drop off the items for delivery. In addition, the vehicle manager 840 may instruct AVs 110 to drive to other locations while not servicing a user, e.g., to improve geographic distribution of the fleet, to anticipate demand at particular locations, to drive to a charging station for charging, etc. The vehicle manager 840 also instructs AVs 110 to return to AV facilities for recharging, maintenance, or storage.

Example AV Door Arrangements

FIG. 9 illustrates an example AV 910 with a delivery window behind the main AV doors according to some embodiments of the present disclosure. The AV 910 is an embodiment of the AV 210 described above. In this example, the area behind the doors 920a and 920b is covered by a shielding material 940, e.g., a plastic cover that fits into the AV 910 and hides most of the main cabin from view and prevents a user from accessing the main cabin. The shielding material 940 has an opening 950 which serves as a window into the main cabin so that a user can access the transport bag 930 in the main cabin through the opening 950. The opening 950 may have a removable cover 960. The removable cover 960 shown in FIG. 9 rolls up to reveal the transport bag 930 and rolls down to hide the transport bag 930. In other embodiments, the removable cover 960 may be a sliding door, a hinged door, or another type of door or cover. The removable cover 960 may be controlled by the door controller 750 or a separate cover controller. The removable cover 960 may hide the transport bag 930 from view and from access until the user is verified, e.g., the user has successfully entered an authorization code in the touchscreen 970 mounted on the shielding material 940. In response to verifying the user, the removable cover 960 opens so that the user can access the transport bag 930. Alternatively or additionally, the removable cover 960 may hide the main cabin from view while the conveyor system revolves the transport bags to position a transport bag for the user behind the opening 950.

FIG. 10 illustrates an example AV 1010 with partially opened doors according to some embodiments of the present disclosure. The AV 1010 is an embodiment of the AV 210 described above. In this embodiment, the doors 1020a and 1020b open to provide an opening of a width w. This width w is smaller than a maximum width $W_{max}$ that the doors 1020a and 1020b are capable of opening. If the transport bag 1030 is a standard size, the opening width w may be a width selected for the bag size, e.g., a width that is wide enough for a user to retrieve the standard transport bag. If different types or sizes of transport bags are used, a camera in the main cabin of the AV may determine a size of the transport bag 1030, and the onboard computer 150 (e.g., the door controller 750) determines the opening width w based on the determined size. Alternatively, the RFID tag or other identifier on the bag may provide data indicating the width of the transport bag 1030; the bag scanner interface 710 may capture this width data and pass the width data to the conveyor system controller 740, which instructs the door controller 750 how widely to open the doors 1020. In some embodiments, if a camera in or on the AV detects that a user is having trouble maneuvering the transport bag through the opening, the door controller 750 may instruct the doors 1020a and 1020b to open further. In the example shown in FIG. 10, the lower portion of the main cabin is shielded by a shielding material 1040, which may be similar to the shielding material 940 described above, and a display 1050 is mounted on the shielding material 1040. In other embodiments, the shielding material 1040 may be removed, and the display 1050 may removed or mounted elsewhere.

Example Conveyor System Rails

FIG. 11 illustrates a detailed view of a rail and two attachment points according to some embodiments of the present disclosure. In this example, the conveyor system includes a rail 1110 that has an internal channel 1115 in which multiple attachment points, including attachment points 1120a and 1120b, are mounted. Each attachment point 1120 includes a control portion 1125, which may be similar to the control portion 625 described with respect to FIG. 6, and a hook 1130, which may be similar to the hook 630 described with respect to FIG. 6. The control portion 1125 connects to a wheel 1135 that is mounted within the channel 1115. The wheel 1135 allows the attachment point 1120 to move within the channel 1115 and revolve the attachment points 1120 around the rail 1110. The rest of the attachment point 1120 is suspended from the wheel 1135.

In this example, the attachment points 1120 are further connected to a flexible ring 1140 that keeps the attachment points 1120 at a fixed distance relative to each other around the conveyor system. The flexible ring 1140 may be comprised of many rigid elements that are linked together at flexible joints. The attachment points 1120 and flexible ring 1140 move to the left or right, as indicated by the arrows, while the rail 1110 is stationary within the AV. The flexible ring 1140 bends to match the shape of the rail at different points along the rail, which may be a stadium or oval shape. The flexible ring 1140 maintains a constant distance between adjacent attachment points 1120 along the rail system, e.g., 20 or 30 inches apart.

FIG. 12 illustrates a detailed view of an alternative implementation of the rail and attachment points according to some embodiments of the present disclosure. In this example, the conveyor system includes a rail 1210 that has a track 1215. The track 1215 may be inside or outside the rail 1210. Attachment points, such as attachment points 1220a and 1220b, are attached to a flexible ring 1240 that is suspended from the rail 1210. The flexible ring 1240 is similar to the flexible ring 1140, but in this example, the flexible ring 1240 connects to the track 1215 via connectors 1235. The connectors 1235 include wheels that move along the track 1215 to revolve the flexible ring 1240 and the attachment points 1220 about the rail 1210. The attachment points 1220 and flexible ring 1240 can move to the left or right, as indicated by the arrows, while the rail 1210 is stationary within the AV. Each attachment point 1220 includes a control portion 1225, which may be similar to the control portion 625 described with respect to FIG. 6, and a hook 1230, which may be similar to the hook 630 described with respect to FIG. 6.

The rails and attachment points, and connections between the rails and attachment points, shown in FIGS. 11 and 12 are merely illustrative, and in other embodiments, the conveyor system may have a different implementation. For example, other embodiments may not include the flexible ring 1140 or 1240, and the relative positions of the attachment points and transport bags may not be fixed, or may be controlled along the rail 1110 or 1210.

Figure 13:
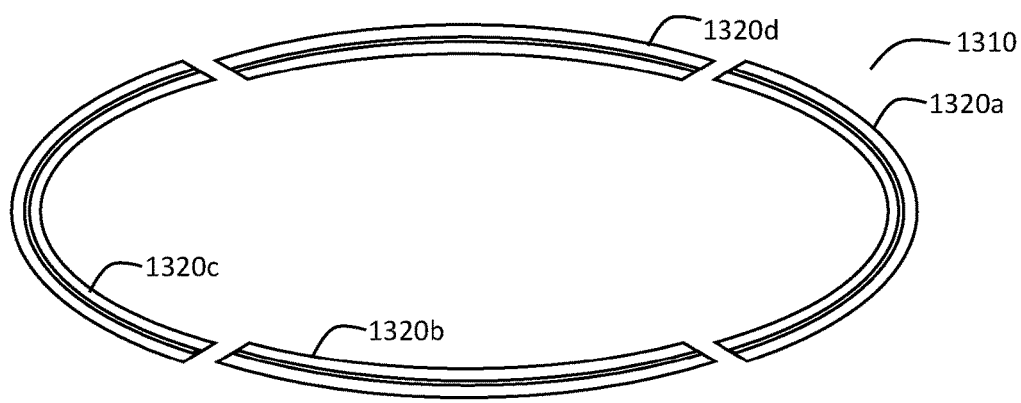
FIG. 13 illustrates a rail for use in the conveyor system according to some embodiments of the present disclosure.

FIG. 13 illustrates a rail 1310 for use in the conveyor system according to some embodiments of the present disclosure. The rail 1310 may be an example of the rail 1110 shown in FIG. 11 or the rail 1210 shown in FIG. 12. The rail 1310 includes four individual components 1320a, 1320b, 1320c, and 1320b that can fit together to form an oval-shaped rail, such as the rail 410 shown in FIG. 5. Assembling the rail 1310 from multiple components enables a fleet operator to load the rail system through the AV doors, e.g., through the opening between the doors 220a and 220b shown in FIG. 2, whereas a fully assembled rail may not fit through the AV doors. The AV may include mounting brackets or another mounting mechanism on the ceiling and/or side walls of the main cabin to mount each of the rail components 1320. In addition, the rail components 1320 may have connectors at their joints so that the rail components 1320 can be smoothly joined together. While the rail 1310 has an oval shape, in other examples, the rail may have a stadium shape, a rounded rectangular shape, or another shape. While four components 1320 are shown in FIG. 13, in other examples, the rail 1310 is composed of more or fewer components.

Example Transport Bag Dividers

Figure 14:
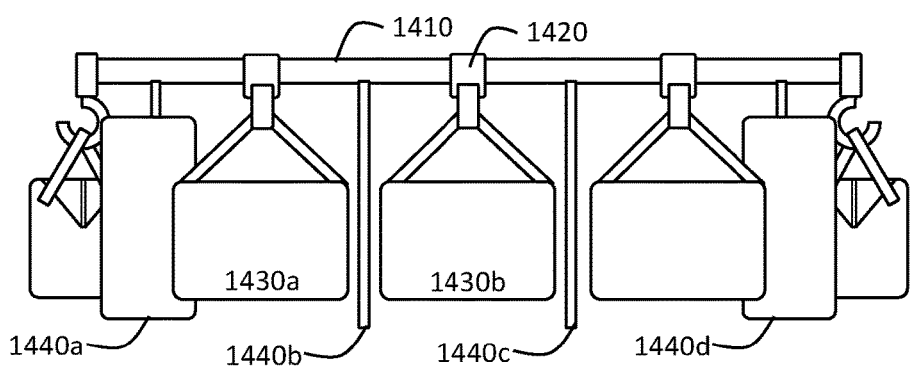
FIG. 14 illustrates a side view of a conveyor system with dividers according to some embodiments of the present disclosure.

FIG. 14 illustrates a side view of a conveyor system with dividers according to some embodiments of the present disclosure. In this example, the conveyor system includes a rail 1410, which may be similar to the rail 1110 or the rail 1210 shown in FIGS. 11 and 12, and transport bags 1430 suspended from the rail 1410 by attachment points, such as attachment point 1420. The conveyor system further includes dividers 1440 that physically separate adjacent transport bags 1430. Four dividers 1440a, 1440b, 1440c, and 1440d are shown in FIG. 14. For example, the divider 1440b physically separates transport bag 1430a from 1430b. The dividers 1440 may be suspended from the rail 1410 and/or a flexible connector that connects the attachment points, e.g., the dividers 1440 may connect to either of the flexible rings 1140 or 1240 shown in FIGS. 11 and 12. The dividers 1440 may help protect the transport bags from each other, e.g., if the transport bags swing while the AV is driving, the dividers 1440 can act as a buffer to reduce impacts between bags. The dividers 1440 may also reduce the risk of users accessing or tampering with neighboring bags while accessing their bags from the AV.

Example Conveyor Belt System

Figure 15:
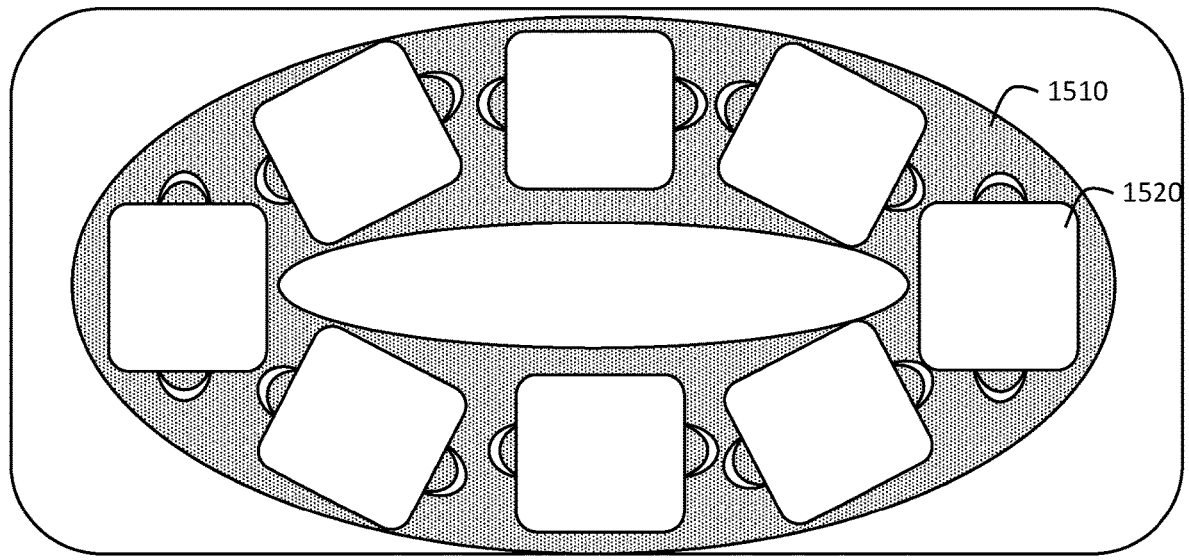
FIG. 15 illustrates a top view of a conveyor belt system according to some embodiments of the present disclosure.

FIG. 15 illustrates a top view of a conveyor belt system according to some embodiments of the present disclosure. In some embodiments, rather than suspending the transport bags from a conveyor system with a rail, as described above, a conveyor belt system 1510 is loaded into the main cabin of the AV, and transport bags 1520 are placed on the conveyor belt system 1510. The conveyor system controller 740 may operate the conveyor belt system 1510 in a similar manner to the conveyor system described above, e.g., by revolving the conveyor belt system 1510 to move the transport bags 1520 to different positions along the conveyor belt system 1510. The conveyor belt system 1510 may have a high-friction surface designed to prevent movement of the transport bags 1520 while the AV is moving. In some embodiments, the conveyor belt system 1510 and transport bags 1520 may have coordinating hook-and-loop strips or pieces to hold the transport bags 1520 in place on the conveyor belt system 1510.

Example Method for Using a Conveyor System

Figure 16:
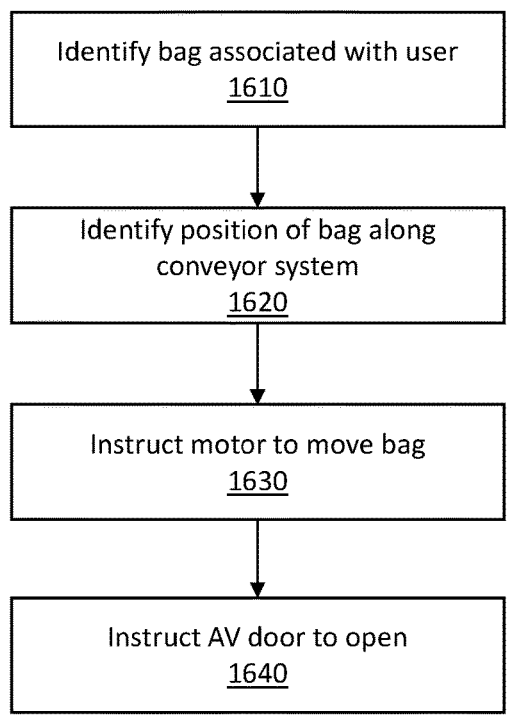
FIG. 16 is a flow diagram showing a process for delivering a transport bag to a user according to some embodiments of the present disclosure.

FIG. 16 is a flow diagram showing a process for delivering a transport bag to a user according to some embodiments of the present disclosure. A conveyor system identifies 1610 a bag associated with a user 1610. For example, the conveyor system controller 740 accesses data stored in the memory 730 that associates identifiers received from the bag scanner interface 710 with users, e.g., based on data received from the fleet management system 120. The conveyor system identifies 1620 a position of the identified bag along the conveyor system. For example, the conveyor system controller 740 determines that the identified bag is at the position of the transport bag 530b shown in FIG. 5. The conveyor system instructs 1630 a motor to move the bag to a position proximate to a door of the AV. For example, the conveyor system controller 740 instructs the motor 510 to move the attachment points and their attached bags around the conveyor system so that the transport bag 530b moves to the position currently occupied by the transport bag 430, i.e., the position between the AV doors 220a and 220b. The conveyor system also instructs 1640 an AV door to open to provide a user access to the bag. For example, the door controller 750 instructs the AV doors 220*a* and 220*b* to slide open to reveal the transport bag.

Select Examples

Example 1 provides an AV that includes a conveyor system, a door, and a conveyor system controller. The conveyor system is arranged with a cabin of the AV and includes a plurality of attachment points for attaching a plurality of transport bags to the conveyor system and a motor to move the plurality of transport bags to different positions along the conveyor system. The door is to provide a user access to at least one of the transport bags. The conveyor system controller is configured to identify a transport bag associated with a user and to issue an instruction to the motor to move the plurality of transport bags along the conveyer system such that the identified transport bag is accessible to the user at the door.

Example 2 provides the AV according to example 1, where the conveyor system further includes a rail mounted to a ceiling of the AV, and the motor is to move the plurality of attachment points and the plurality of transport bags along the rail.

Example 3 provides the AV according to example 2, where the rail includes a plurality of rail components that fit together to form the rail, each rail component sized to fit through the door of the AV.

Example 4 provides the AV according to any of the preceding examples, where each attachment point includes a hook for hanging a corresponding one of the plurality of transport bags.

Example 5 provides the AV according to example 4, where the hook includes a locking portion that closes to secure the transport bag to the conveyor system.

Example 6 provides the AV according to any of the preceding examples, where the conveyor system further includes a plurality of dividers, each of the plurality of dividers physically separating a transport bag from a neighboring transport bag.

Example 7 provides the AV according to any of the preceding examples, where each of the plurality of attachment points includes one of a plurality of weight sensors, each weight sensor to measure a weight of a corresponding one of the plurality of transport bags.

Example 8 provides the AV according to example 7, further including processing circuitry to receive a weight measurement from each of the plurality of weight sensors and determine an instruction to move at least one of the plurality of transport bags from a first attachment point to a second attachment point based on the weight measurements.

Example 9 provides the AV according to any of the preceding examples, where the conveyor system controller is further configured to store, in a memory, data associating each of the plurality of transport bags with a corresponding one of the plurality of attachment points; access the data to identify a current position of the transport bag associated with the user; and generate the instruction to the motor to move the plurality of transport bags along the conveyer system based on the current position of the transport bag associated with the user.

Example 10 provides the AV according to any of the preceding examples, where each attachment point includes an RFID reader configured to receive, from an RFID tag on one of the plurality of transport bags, data associated with the user associated with the transport bag.

Example 11 provides a conveyor system that includes a rail to mount to a ceiling of a vehicle, a plurality of attachment points for attaching a plurality of transport bags to the rail, a motor to move the plurality of transport bags to different positions along the conveyor system, and a conveyor system controller configured to identify a transport bag associated with a user and issue an instruction to the motor to move the plurality of transport bags along the conveyer system such that the identified transport bag is accessible to at a door of the vehicle.

Example 12 provides the conveyor system according to example 11, where each attachment point includes a hook for hanging a corresponding one of the plurality of transport bags, the hook having a locking portion that closes to secure the transport bag to the conveyor system.

Example 13 provides the conveyor system according to example 11 or 12, the conveyor system further including a plurality of dividers, each of the plurality of dividers physically separating a transport bag from a neighboring transport bag.

Example 14 provides the conveyor system according to any of examples 11 through 13, where each of the plurality of attachment points includes one of a plurality of weight sensors, each weight sensor to measure a weight of a corresponding one of the plurality of transport bags.

Example 15 provides the conveyor system according to any of examples 11 through 14, the conveyor system controller further configured to store, in a memory, data associating each of the plurality of transport bags with a corresponding one of the plurality of attachment points; access the data to identify a current position of the transport bag associated with the user; and generate the instruction to the motor to move the plurality of transport bags along the conveyer system based on the current position of the transport bag associated with the user.

Example 16 provides the conveyor system according to any of the examples 11 through 15, where each attachment point includes an RFID reader configured to receive, from an RFID tag on one of the plurality of transport bags, data associated with the user associated with the transport bag.

Example 17 provides a method for delivering a transport bag to a user that includes identifying a transport bag associated with a user, the transport bag attached to a conveyor system mounted in an AV; identifying a first position along the conveyor system of the identified transport bag; instructing a motor to move the conveyor system so that the identified transport bag moves from the first position along the conveyor system to a second position along the conveyor system, the second position proximate to a door of the AV; and instructing a door of the AV to open so that a user can access the identified transport bag from the AV.

Example 18 provides the method according to example 17, further including identifying a second transport bag associated with the user, the second transport bag attached to the conveyor system at a third position along the conveyor system; determining that the user has removed the transport bag from the AV; and in response to determining that the user has removed the transport bag from the AV, instructing the motor to move the conveyor system so that the second transport bag moves from the third position along the conveyor system to a second position along the conveyor system.

Example 19 provides the method according to example 17 or 18, further including receiving information from the user to verify the user associated with the transport bag; determining that the user is authorized to receive the transport bag based on the information; and in response to determining that the user is authorized, instructing a lock securing the transport bag to the conveyor system to open.

Example 20 provides the method according to any of examples 17 through 19, further including receiving information from the user to verify the user associated with the transport bag; determining that the user is authorized to receive the transport bag based on the information; and in response to determining that the user is authorized, instructing a door blocking a receiving window providing access to the transport bag to open.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. An autonomous vehicle (AV) comprising:
a conveyor system arranged within a cabin of the AV, the conveyor system comprising:
a rail;
a plurality of attachment hooks, each attachment hook coupled to the rail, and each attachment hook configured to hold a transport bag; and
a motor to move the plurality of attachment hooks to different positions along the conveyor system;
a door to provide a user access to transport bags; and
a conveyor system controller configured to:
identify one of the plurality of attachment hooks holding a transport bag associated with a user; and
issue an instruction to the motor to move the plurality of attachment hooks along the conveyor system such that the transport bag held by the identified attachment hook is accessible to the user at the door.

2. The AV of claim 1, wherein the rail is mounted to a ceiling of the AV, and the motor is to move the plurality of attachment hooks along the rail.

3. The AV of claim 2, wherein the rail comprises a plurality of rail components that fit together to form the rail, each rail component sized to fit through the door of the AV.

4. The AV of claim 1, wherein each of the plurality of attachment hooks comprises a locking portion that closes to secure the transport bag to the conveyor system.

5. The AV of claim 1, the conveyor system further comprising a plurality of dividers, each of the plurality of dividers physically separating a transport bag from a neighboring transport bag.

6. The AV of claim 1, wherein each of the plurality of attachment hooks is coupled to a respective one of a plurality of weight sensors, each weight sensor to measure a weight of a transport bag.

7. The AV of claim 6, further comprising processing circuitry to:
receive a weight measurement from each of the plurality of weight sensors; and
determine an instruction to move a transport bag from a first attachment hook to a second attachment hook based on the weight measurements.

8. The AV of claim 1, the conveyor system controller configured to:
store, in a memory, data associating each of a plurality of transport bags with a corresponding one of the plurality of attachment hooks;
access the data to identify a current position of the transport bag associated with the user; and
generate the instruction to the motor to move the plurality of attachment hooks along the conveyor system based on the current position of the transport bag associated with the user.

9. The AV of claim 1, each attachment hook comprising a radio frequency identification (RFID) reader configured to receive, from an RFID tag on a transport bag, data associated with a user associated with the transport bag.

10. The AV of claim 1, the conveyor system comprising a plurality of attachment points, each of the plurality of attachment points comprising a respective one of the plurality of attachment hooks and a respective one of a plurality of control portions.

11. A conveyor system comprising:
a rail to mount to a ceiling of a vehicle;
a plurality of attachment hooks, each attachment hook coupled to the rail, and each attachment hook configured to hold a transport bag;
a motor to move the plurality of attachment hooks to different positions along the conveyor system; and
a conveyor system controller configured to:
identify one of the plurality of attachment hooks holding a transport bag associated with a user; and
issue an instruction to the motor to move the plurality of attachment hooks along the conveyor system such that the transport bag held by the identified attachment hook is accessible to at a door of the vehicle.

12. The conveyor system of claim 11, wherein each hook comprises a locking portion that closes to secure the transport bag to the conveyor system.

13. The conveyor system of claim 11, further comprising a plurality of dividers, each of the plurality of dividers physically separating a transport bag from a neighboring transport bag.

14. The conveyor system of claim 11, wherein each of the plurality of attachment hooks is coupled to a respective one of a plurality of weight sensors, each weight sensor to measure a weight of a transport bag.

15. The conveyor system of claim 11, the conveyor system controller configured to:
store, in a memory, data associating each of a plurality of transport bags with a corresponding one of the plurality of attachment hooks;
access the data to identify a current position of the transport bag associated with the user; and
generate the instruction to the motor to move the plurality of attachment hooks along the conveyor system based on the current position of the transport bag associated with the user.

16. The conveyor system of claim 11, each attachment hook coupled to a respective one of a plurality of radio frequency identification (RFID) readers, each RFID reader configured to receive, from an RFID tag on a transport bag, data associated with a user associated with the transport bag.

17. A method for delivering a transport bag to a user, the method comprising:
identifying a transport bag associated with a user, the transport bag attached, via an attachment hook, to a conveyor system mounted in an autonomous vehicle (AV), the conveyor system comprising a rail and a plurality of attachment hooks coupled to the rail;
identifying a first position along the conveyor system of the identified transport bag;
instructing a motor to move the plurality of attachment hooks to different positions along the conveyor system so that the identified transport bag moves from the first position along the conveyor system to a second position along the conveyor system, the second position proximate to a door of the AV; and
instructing a door of the AV to open so that a user can access the identified transport bag from the AV.

18. The method of claim 17, further comprising:
identifying a second transport bag associated with the user, the second transport bag attached, via a second attachment hook, to the conveyor system at a third position along the conveyor system;
determining that the user has removed the transport bag from the AV; and
in response to determining that the user has removed the transport bag from the AV, instructing the motor to move the plurality of attachment hooks to different positions along the conveyor system so that the second transport bag moves from the third position along the conveyor system to the second position along the conveyor system.

19. The method of claim 17, further comprising:
receiving information from the user to verify the user associated with the transport bag;
determining that the user is authorized to receive the transport bag based on the information; and
in response to determining that the user is authorized, instructing a lock securing the transport bag to the conveyor system to open.

20. The method of claim 17, further comprising:
receiving information from the user to verify the user associated with the transport bag;
determining that the user is authorized to receive the transport bag based on the information; and
in response to determining that the user is authorized, instructing a door blocking a receiving window providing access to the transport bag to open.

* * * * *